United States Patent Office 2,963,340
Patented Dec. 6, 1960

2,963,340

FORMATION OF FIBERS FROM POLYMERIC DISPERSIONS WHICH CONTAIN A THICKENING AGENT

Cameron B. Satterthwaite, Wilmington, Del., assignor to E. I. du Pont de Nemours and Company, Wilmington, Del., a corporation of Delaware No Drawing. Filed Apr. 10, 1953, Ser. No. 348,119

11 Claims. (Cl. 18—54)

This invention relates to a process for the preparation of funicular structures from synthetic polymers. Further, it pertains to an improved process for the preparation of textile fibers and filaments from discrete particles of these polymers dispersed in organic liquids. Still further, it relates to a process for maintaining the discrete particles in the proper dispersed state during extrusion and for improving such dispersion.

Dispersions containing appreciable solids in particulate form are sometimes difficult to handle in shaping filaments. The particle size of the solids in the dispersion usually varies, and frequently in filament formation it is desired that the particles not be uniform in size prior to extrusion. Although the particles may all be smaller than the orifice immediately after preparation of the dispersion, on standing prior to extrusion or during extrusion, the same particles tend to adhere or blend with other particles. Plugging of the spinneret orifices occurs. Also, the orifices used in making textile fibers are very small and the dispersions are extremely sensitive to shear. This sensitiveness causes certain dispersions to break; extrusion is then impossible. In making textile filaments the dispersion has to be filtered prior to extrusion. The phenomena described above result in plugging of the filters and of the orifices.

Accordingly, an object of this invention is to provide polymer dispersions which can be filtered prior to extrusion without coagulation of the polymer and which can be extruded through small orifices without blocking the orifices. Another object is the provision of an improved process for the preparation of funicular structures from dispersions comprising polymer particles dispersed in organic liquids. A still further object is the preparation of such structures from the dispersions without previous isolation and purification of the polymers. Other objects are contained herein.

The objects of this invention are accomplished by dispersing a synthetic polymer in an organic liquid which has substantially no solvent or swelling action on the polymer at the ordinary temperatures involved prior to extrusion but which does have such action at elevated temperatures. To the dispersion or to the organic liquid used in making the dispersion is added a polymeric thickening agent which is soluble in the organic liquid being used. This agent increases the viscosity of the dispersion. The resultant modified dispersion is then filtered and extruded through a spinneret to form a funicular structure which is self-supporting. This is then passed through a heated zone where the temperature is sufficiently high to cause coalescence of the polymer particles by the organic liquid. The coalesced fiber is then cooled.

The thickening agent increases the viscosity of the dispersion and prevents coagulation of the dispersion and plugging of the filter pack and spinneret orifices. The spinning process is smooth and continuous.

The following examples are given for illustrative purposes only and are not limitative. The parts are by weight and all processes were carried out at room temperature (about 25° C.) unless otherwise stated.

Example I

A solution of cellulose acetate in propylene carbonate was prepared which contained 5% cellulose acetate by weight. A paste was prepared with this solution by adding polyacrylonitrile having an intrinsic viscosity of 6.9. The intrinsic viscosity was measured with an Ostwald viscosimeter using solutions of the polymer in N,N-dimethylformamide. The resulting paste was extruded through a capillary spinneret into an oil bath heated to 165° C. The coalesced filaments were collected on a bobbin. They were subsequently drawn at 170° C. to eight times their original length and were then washed in acetone and boiled off in water. The dried filaments were strong and flexible.

Example II

A solution of cellulose acetate in adiponitrile containing 5% cellulose acetate by weight was prepared. By the transfer process thickened dispersion was prepared by mixing 62.5 grams of this solution with 100 grams of an aqueous dispersion containing 40% polyacrylonitrile. The paste remaining after discarding the water layer was milled on a 3-roll ink mill to improve the homogeneity. The paste was filtered through a pack composed of 50 and 200 mesh screens and ½" of sand prior to extrusion. A similar paste prepared without the cellulose acetate quickly plugged the filter so that the dispersion could not pass through. No difficulty was experienced in filtering the dispersion thickened with cellulose acetate.

Immediately after filtering the dispersion was extruded through a capillary spinneret into an oil bath heated to 205° C. The coalesced filaments were drawn at 160° C. to 13 times their original length. The filaments were then collected on a bobbin and washed with acetone and then with water. After drying and conditioning, the filaments had the following properties: denier, 5.9; tenacity, 5.7 g.p.d.; elongation, 16.5%; initial modulus, 60.7 g.p.d.

Example III

A 90/10 copolymer of acrylonitrile and vinyloxyethyl formamide was dissolved in propylene carbonate to give a solution containing 10% by weight of the copolymer. 94 grams of this solution was mixed with 108 grams of an aqueous dispersion of polyacrylonitrile. The polyacrylonitrile transferred from the aqueous phase to the propylene carbonate phase. The thickened dispersion was washed with water and dried. The paste was milled on a 3-roll ink mill with the addition of small quantities of propylene carbonate. The final dispersion contained 29.2% polyacrylonitrile as determined by acetone extraction.

The paste was extruded through a 0.007" monofil spinneret into an oil bath heated to 150°C. The coalesced filaments were wound up on a bobbin at 500 ft. per minute. They were subsequently drawn, using a roll heated to 180° C., to 2½ times their original length. They were again collected on a bobbin where they were washed with acetone and water. The final filaments, containing 19% of the acrylonitrile/vinyloxyethyl formamide copolymer, had the following properties: tenacity, 4.1 g.p.d.; elongation, 23%; initial modulus, 40 g.p.d.; denier, 3.5.

Example IV

A thickened dispersion identical with that described in Example II was extruded through a 5-hole capillary spinneret into a flowing oil bath heated to 203° C. After four feet of travel in the bath the filaments were simultaneously withdrawn from the bath and wound up at 80 yards per minute. The fibers were drawn to nine times their original length over a roll heated to 165° C. and subsequently washed in acetone and boiling water. The resulting fibers had the following properties: tenacity, 5.2 g.p.d.; elongation, 19%; denier per filament, 8.5.

*Example V*

Cellulose acetate was dissolved in adiponitrile to produce a solution containing 5% by weight cellulose acetate. 30 grams of this solution was mixed with 77 grams of an aqueous dispersion of polyvinyl fluoride. The polyvinyl fluoride transferred to the adiponitrile phase and the resulting thickened dispersion contained 40% polyvinyl fluoride.

The dispersion was extruded through a hypodermic needle spinneret into an oil bath heated to 150° C. The coalesced filament was wound up on a bobbin.

*Example VI*

11 grams of polyethylene terephthalate was dissolved in 98 grams of fomal (58.8% phenol, 41.2% trichlorophenol). The polymer was precipitated in finely divided form by adding 150 grams of dioxane to the solution. The polymer was separated by filtration and washed several times with methanol.

Polyethylene sebacate was dissolved in meta-cresol to produce a solution containing 5% by weight polyethylene sebacate. 8 grams of polyethylene terephthalate prepared above was dispersed in 20 grams of the polyethylene sebacate solution.

The resulting thickened dispersion was extruded from a spinneret into an oil bath heated to 120° C. The plastic filaments which were obtained could be oriented by drawing at room temperature.

The polyethylene sebacate could be replaced by a 50/50 copolymer of polyhexamethylene adipamide and polyhexamethylene sebacamide or a 60/40 copolymer of polyethylene terephthalate and polyethylene sebacate.

As can be seen from the examples above, the process of this invention involves the preparation of thickened dispersions containing polymer particles of such size that permits their extrusion through the spinneret orifices. For this the paste should contain substantially no particles having diameters larger than the smallest dimension in any orifice, that is the web of the orifices. Preferably, these diameters should be less than one half of the web. This is a very important factor in the preparation of textile denier fibers by the process of this invention. Generally, undesirably large particles are not present and do not form prior to extrusion. However, if they are present or do form, they are very readily removed by filtration due to the beneficial action of the thickening agent.

In this process the synthetic polymer is dispersed in a liquid medium which contains a polymeric thickener dissolved therein and which has substantially no solvent action on the polymer at room temperature but which is capable of swelling or dissolving the polymer at an elevated temperature, preferably below the boiling point of the solvent. The dispersion, which may contain up to 70% polymer and usually is in the form of a smooth paste, is shaped by extruding through an orifice. The funicular structure formed is self-supporting and is passed through a heated zone to coalesce the polymer particles. The structure is then cooled; a solid continuous fiber or filament is produced.

For the purposes of this invention, a liquid medium may be used as a coalescing agent if it swells a polymer as much as the following polymers are swollen under the specified conditions: (1) polyvinyl chloride suspended in di-2-ethylhexyl phthalate heated to 150° C., (2) polyacrylontrile suspended in propylene carbonate heated to 100° C. or in adiponitrile heated to 160° C. or (3) polyvinyl fluoride suspended in adiponitrile heated to 130° C., (4) cellulose acetate suspended in "Santicizer" M-17 at 100° C. or (5) N-methoxymethyl polyhexamethylene adipamide suspended in "Hercoflex" 900 at 80° C. These are merely given as test procedures and other tests may be used to select out of the many organic liquid coalescing agents a candidate for spinning a specific polymer.

Liquids suitable for use as dispersion media are those which do not exert any appreciable solvent action on the major fiber-forming polymer at room temperature, but which are capable of swelling the polymer at an elevated temperature. This temperature is preferably below the boiling point of the liquid because the coalescence is usually carried out at atmospheric pressure and in the absence of any appreciable agitation. Another criterion is that the liquids be able to dissolve at least 0.5% by weight of a thickening agent. Generally, the dispersion media are plasticizers or organic liquids which would be classified as poor or "fringe" solvents for the polymer. Liquids in which the polymers are appreciably soluble at room temperature may be used, but it is necessary to reduce the solvent activity by the addition of non-solvent liquids. Choice of the proper dispersing agent is, of course, dependent upon the particular polymer which is being dispersed and the particular thickening agent which is being dissolved.

Suitable liquids or mixtures of liquids may soften the surface of the polymer particles slightly at room temperature but they do not penetrate into the interior of the particles. This is evident from the fact that dispersed particles of polymers which are normally crystalline in the isolated state still show a sharp X-ray diffraction pattern in the dispersion. Appreciable solvent penetration would be expected to produce a diffuse pattern.

Properly prepared thickened dispersions are smooth flowable pastes. These contain up to 70% of the major fiber-forming polymer, although it is preferred that they contain from 25 to 60% of the polymer. Fibers and filaments may be prepared from the dispersions which contain polymer particles up to 30 microns in diameter, although it is preferred that the diameter of the polymer particles be below 20 microns. The particles in a given dispersion need not be uniform in size. In fact, it is preferred to use a dispersion having a relatively wide range of particle sizes. However, the methods of preparing dispersions usually lead to a fairly narrow size range and dispersions having such ranges in particle size perform well in the process of this invention. Various other materials may be added to the thickened dispersions if they are compatible with them. For example, dispersions may contain dispersing agents, plasticizers, pigments, dyes, clay, silica and similar materials frequently added to fibers and filaments.

The dispersions of this invention are converted into funicular articles by extruding and then coalescing the major fiber-forming polymer. The thickening agent may coagulate, but this is not essential to the process, and, in fact, the thickeners may be completely removed, by washing or extraction, for example. Any one of a number of methods may be used for carrying out this operation. The best method will, of course, depend upon the particular combination of polymer and dispersing medium being used.

Coalescence may be achieved by extruding tthe paste filaments through a hot tube furnace and heating with radiant heat. Alternatively, the paste filaments may be permitted to fall by gravity through a zone where they are heated by radiant heat such as may be supplied by infra-red lamps. It is also possible to coalesce the paste fiber by passing it through a hot vapor bath where the filaments are heated by condensation of vapor.

The preferred method is to extrude the cold paste into a hot liquid coalescing bath. All of the methods described have the advantage that the polymer is heated for very short periods of time. This practically eliminates thermal degradation of the polymer. The liquid coalescing bath has the further advantage that the liquid serves to support the weak freshly extruded paste filament. It is important to note here that, although the freshly formed filaments are relatively weak, this invention provides a process for forming filaments and fibers from dispersions of discrete polymer particles without the aid of mechanical supports for the freshly extruded funicular structure.

The paste dispersions used in this invention are very stable and can be stored for long periods of time before using. Occasionally a particular paste may tend to gel, but the time factor involved usually permits storing, piping and extrusion prior to gelation so that no difficulty is involved. Extrusion is usually at room temperature, although the dispersions may be heated to some extent prior to extrusion, providing very little or no coalescence occurs prior to extrusion. While some coalescence may occur during extrusion due to the effects of shear and heat, substantially all of the coalescence occurs after extrusion. The zone in which coalescence occurs may be a liquid bath, a heated air or similar vapor gap, a furnace or similar media or combinations thereof. The extruded dispersion is set or fixed in the form of a funicular structure or as a paste filament and substantially all of the coalescing occurs after the formation of this funicular structure. Coalescing temperatures vary, being dependent upon the activity of the liquid agent. Usually temperatures of about 90° C. to about 400° C. are used although lower and higher temperatures can be employed. The time involved in coalescence is very short being of the order of 0.1 to 10 seconds. The given conditions will vary somewhat with the polymer, the dispersing media, the coalescing agent, the denier of the filaments and similar factors.

In the present invention the spinning of filaments is preferably carried out using a flowing bath in which the current is in the direction of filament travel. This can be done using flumes, inclined troughs or spinning tubes such as described in Millhiser U.S. Patent 2,440,057 or Drisch et al. U.S. Patent 2,511,699. In this way the filaments are supported before and during coalescence and carried by the current of the bath, requiring the filaments themselves to bear only very slight tension. It is thus possible to increase materially the rate of spinning without substantial sacrifice in continuity and in the desirable properties of the yarn produced.

The liquid or mixtures of liquids which are used in the coalescing bath should preferably be non-solvents for the medium in which the polymer is dispersed. It is, however, possible to use a liquid coalescing bath which is a solvent for the dispersing medium if the bath is saturated with the dispersing medium. The coalescing bath and dispersing medium can be the same if the liquid is not too active a solvent for the polymer. It is evident that the coalescing bath should not dissolve the polymer appreciably at the temperature of the bath. Plasticized filaments and fibers are generally obtained regardless of the coalescence technique employed. The plasticizer is subsequently removed by washing.

After the polymer has been coalesced, the shaped article is washed to remove the dispersing medium. Occasionally a portion of any thickening agent remaining in the fiber or filaments will also be removed by this washing operation. However, appreciable quantities of the thickening agent can usually be permitted to remain in the finished article without materially reducing its desirable properties. Small quantities of the dispersing medium can be tolerated in the finished article but it is preferred that substantially all of this liquid be removed. The fibers and filaments are washed with a liquid which is a solvent for the dispersing medium. For practical reasons it is preferred to use water for washing whenever possible. If solvents other than water must be used, the shaped article would be subsequently washed with water to remove the wash liquid unless this liquid is sufficiently volatile to evaporate readily on heating.

This washing operation may be carried out in a variety of ways. The continuous funicular structure may be removed from the coalescing bath and deposited into a bath of wash liquid by means of a transfer roll or it may be dragged from one bath to the other over a weir. It is also possible to wind up filaments and fibers on a suitable package such as a bobbin and wash them while wound on this package.

When filaments and fibers are prepared by this process they may also be subjected to other suitable after-treatments such as drawing or stretching. The filaments can be drawn and oriented either before or after extraction of the dispersing medium. It is possible to carry out a part of the drawing operation before removal of the dispersing medium and to complete the drawing operation after washing and/or drying. Drawing before washing has the advantage that it permits this operation to be carried out at a lower temperature. In the preparation of polyacrylonitrile fibers it is preferred that at least part of the drawing be done before washing since the completely undrawn extracted fiber is rather brittle.

Polymeric materials suitable for use as thickening agents must meet the following two requirements: (1) They must be sufficiently soluble in the dispersing medium for the major fiber-forming polymer constituent to form a solution containing at least 0.5% by weight of the thickening agent. (2) They must be sufficiently soluble in the dispersing medium to form a solution having a viscosity of at least 100 centipoises at 25° C. when none of the major fiber-forming polymer is present. It is, of course, obvious that the thickening agent must be compatible with the polymer dispersion, i.e., that it must not coagulate the polymer. The polymeric thickeners are used in amounts of about 0.5% to about 20%, based on the weight of the dispersion, amounts of about 2% to about 10% being preferred.

The "major fiber-forming polymer constituent" is the polymer which is dispersed as discrete particles in the spinning paste and constitutes the major portion of the finished filament or fiber. In most cases at least small amounts of the thickening agent remain in the finished fiber. The thickening agent may or may not be fiber-forming. The quantity of thickening agent which remains in the finished product will depend upon the choice of the coalescing media and coalescing conditions and on the nature of subsequent after-treatments such as washing. However, in all cases the thickening agent will represent a minor constituent of the final filament or fiber.

The solubility characteristics of operable thickening agents vary quite widely, as do the solubilities of the major fiber-forming polymers. Consequently, it is not possible to list a group of polymeric thickening agents which can be used with all polymers or in all dispersions. This is also true of dispersion media, which must be selected to suit the particular polymer being used. Likewise, the choice of thickening agent will depend upon the fiber-forming polymer and the dispersion media selected. However, to illustrate the types of thickening agents which can be used in this process, examples are given below of thickeners which can be used in specific systems. These examples are not considered to be exhaustive or to limit the invention in any way.

The following are examples of thickening agents which may be used for vinyl chloride polymers dispersed in ester-type (e.g., tricresyl phosphate) dispersing media: cellulose acetate, polyvinyl acetate, polymethylmethacrylate, polymethylacrylate, polystyrene and alkyd resins.

Thickening agents which may be used with dispersions of acrylonitrile polymers in adiponitrile or propylene carbonate include the following: cellulose acetate, polymethylmethacrylate and copolymers of acrylonitrile with methyl methacrylate and vinyloxyethyl formamide.

Thickening agents suitable for use in polyamide dispersions include methacrylates, such as polymethylmethacrylate and polybutylmethacrylate; phenol-formaldehyde resins, urea formaldehyde resins, polyethers, polyvinyl alcohol, styrene polymers and copolymers, alkyd resins, polyvinyl acetate, partially hydrolyzed polyvinyl acetate, and cellulose ethers and esters. A 95/5 copolymer of vinyl acetate and crotonic acid is particularly useful with polyamide dispersions.

Dispersions of ethyl cellulose may be modified by the addition of phenol-formaldehyde resins, coumar resins, alkyd resins, etc.

One method of preparing the dispersions is to mix dry polymer powder with a suitable liquid media. In this case the thickening agent may be added either before, after, or concurrently with the fiber-forming polymer when it is dispersed.

Another method is a phase transfer method known as "flushing," in which dispersed particles are transferred from water into a non-aqueous medium. When this method is used the thickening agent may be added to the non-aqueous medium and the fiber-forming polymer transferred from the aqueous phase into the thickened non-aqueous medium. It is also possible to add the thickening agent to the non-aqueous dispersing medium after the phase transfer step has been completed. Regardless of the stage at which the thickening agent is added, the thickened dispersion may then be subsequently subjected to milling operations to produce a more homogeneous paste.

Polymers which may be used as the major fiber-forming constituents of these dispersions include the following specific polymers and classes of polymers: acrylonitrile polymers; including the homopolymer and copolymer with mono- or diethylenically unsaturated monomers such as the vinyl pyridines, the acrylates, butadiene and the various copolymerizable monomers disclosed in the art such as U.S. 2,404,714 to 2,404,727; polyacrylic and polymethacrylic esters, such as polymethylmethacrylate; vinylidene chloride polymers, polyethylene, polyvinyl acetate, polymethyl vinyl ketone; polyvinyl ethers, such as polymethyl vinyl ethers; polyvinyl carbazole, polyvinyl acetals; polyvinyl chloride and interpolymers of vinyl chloride with vinyl esters, acrylonitrile and the like; partially hydrolyzed polyvinyl esters; polyamides, such as polyhexamethylene adipamide, N-methoxymethyl polyhexamethylene adipamide, polyethylene sebacamide, polymethylene bis (para-cyclohexylene) adipamide; polyureas, formaldehyde polymers, polyesters, polyesteramides, polysulfonamides; polysulfones; cellulose derivatives, such as cellulose acetate, and many others. The process can also be employed to convert a mixture of polymers into a funicular structure from a single dispersion. Coalescible copolymers of the above classes of homopolymers may also be used.

This process requires no dissolving or melting step prior to extruding the polymer. Polymers prepared by bulk polymerization methods are ground into a fine powder and can then be readily dispersed in the liquid media. If desired, the size of the polymer particles can be further reduced by milling or grinding the dispersion to improve the smoothness and the uniformity of the paste. Polymers which are prepared in aqueous media by emulsion or suspension polymerization techniques can be readily dispersed in a suitable media by the well-known phase transfer technique. This eliminates the steps of isolating, purifying and redispersing the polymer.

For example, many polymers, particularly the vinyl-type polymers, are made most readily by polymerizing in an aqueous medium in which the polymer, and many times the monomer, is insoluble. Aqueous dispersions containing up to 60% solids by weight are easily obtained and the viscosity is independent of the molecular weight of the dispersed polymer. In dry, wet or melt spinning procedures, the polymer must invariably be isolated from the dispersion and shaped into articles by means of a melt or solution process. The process of this invention permits preparation of funicular structures from these aqueous dispersions without isolating and/or dissolving or melting the polymer prior to spinning and is, therefore, very attractive commercially.

In order for a process for spinning continuous filaments and fibers from dispersions of the type used herein to be operable on an economic commercial scale, each jet or spinneret has to operate continuously for a number of hours without interruption. Frequent breaks in the spinning process increase greatly the manpower requirements for operating the process and add prohibitively to the cost of the product. Also the yarn package obtained is virtually useless in subsequent textile operations.

The most common cause of spinning discontinuities is plugging of spinneret holes by gel particles and extraneous matter in the solution or dispersion which is being spun. In order to minimize this problem, the spinning mixtures are generally filtered prior to extruding through the spinneret. When attempts were made to filter certain of the dispersions containing no thickener, it was found that the polymer separated from the dispersion (i.e., coagulated) and plugged the filter. The filtering medium rapidly filled with polymer and became useless. Furthermore, the polymer content of the filtered dispersion was reduced to the extent that the dispersion could no longer be utilized for spinning. This problem has been overcome by the process of this invention.

By this invention the difficulties of fabrication from solutions of high molecular weight polymers are avoided. For example, the gelation, balling up and chemical degradation, which result from heating polymer-solvent mixtures to produce solutions, are eliminated. Flowable dispersions can be prepared which contain relatively high concentrations of high molecular weight polymers. Since the viscosity of these dispersions is substantially independent of the molecular weight of the polymers, this invention can be used successfully with polymers that have molecular weights so high that ordinary solution spinning techniques are inapplicable.

A further advantage of the process is that isolation of polymer, when it is prepared as an aqueous dispersion, is not required when the phase transfer method is used. Since organic vinyl-type polymers of high quality are usually best prepared in aqueous dispersions, fabrication processes operable directly on the dispersion without isolation and dissolving of the polymer are particularly attractive economically. In addition, the relatively low viscosity of high solids dispersions compared with high viscosity solutions and the ability to handle difficultly soluble polymers of unusually good properties are distinct advantages. Furthermore, the temperatures employed in most of the steps of this invention are low, in the vicinity of room temperature, and since the exposure to high temperature in the other steps of the process is very brief, the products are not discolored during formation and are essentially white. The finished products possess the high strength, flexibility, and toughness required for fiber and filament applications.

The improved process of this invention also possesses several advantages over the same process operated without thickeners. For example, the use of thickeners makes it possible to meter the dispersions with a viscose-type gear pump and to filter them through a fine screen and sand filter pack prior to extrusion. It was not possible to carry out these operations, except with great difficulty, with many of the unmodified paste dispersions. These improvements represent an important advance toward developing a process which can be used on a commercial scale, for any process of this type would be at an economic disadvantage commercially if it did not include a simple method for metering and filtering the dispersions.

Another advantage of the improved process is that the freshly extruded paste filaments are much stronger. The strength of these paste filaments is very closely related to the viscosity of the dispersion which is spun. For example, a dispersion made from a plasticizer with a viscosity of 165 centipoises held about 10″ of its own weight prior to coalescence, whereas similar dispersions made from plasticizers with 370 and 800 centipoises held 3 feet and 4½ feet, respectively, of their own weight prior to coalescence. The increase in strength of the freshly extruded paste filament greatly simplifies the spinning process and permits a substantial increase in spinning speed. This increased productivity is also important from the standpoint of commercial utility.

Still another advantage is that a wide variety of polymers may be used in this process. These polymers are readily available and have molecular weights in the fiber-forming range—that is, about 5,000 and preferably above 8,000.

Any departure from the above description which conforms to the present invention is intended to be included within the scope of the claims.

I claim:

1. The process for preparing fibers from a synthetic organic fiber-forming polymer which comprises forming a flowable dispersion of particles of the said polymer in an organic liquid which has substantially no solvent action thereon at room temperature but which coalesces the said particles at elevated temperature, said dispersion containing about from 0.5 to about 20% by weight of an organic synthetic high molecular weight thickening agent dissolved in the liquid; the said agent being compatible with the fiber-forming polymer and imparting a viscosity of at least 100 centipoises at 25° C. when dispersed in the liquid when none of the fiber-forming polymer is present; maintaining the particles in the resultant thickened dispersion substantially in their particulate uncoalesced state prior to and during extrusion; extruding the thickening dispersion to form a funicular structure; coalescing the polymer particles in the said structure by heating it to form the said fibers, and thereafter removing the said organic liquid therefrom.

2. The process of claim 1 in which the thickened dispersion is extruded through a spinneret into an oil bath, the temperature of which is sufficient to coalesce the fiber-forming polymer particles.

3. The process of claim 1 in which the thickening agent is present in the amount of about 2% to about 10% by weight based on the weight of the dispersion.

4. The process of claim 1 in which the thickening agent is cellulose acetate.

5. The process of claim 1 in which the thickening agent is polymethylmethacrylate.

6. The process of claim 1 in which the thickening agent is a copolymer of acrylonitrile with methylmethacrylate and vinyloxyformamide.

7. The process of claim 1 in which the thickening agent is an organic cellulose derivative.

8. The process of claim 1 in which the fiber-forming polymer is one of acrylonitrile.

9. The process of claim 1 in which the fiber-forming polymer is a polyamide.

10. The process of claim 1 in which the fiber-forming polymer is a polyvinylfluoride.

11. The process of claim 1 in which the fiber-forming polymer is a glycol terephthalate polyester.

References Cited in the file of this patent

UNITED STATES PATENTS

| | | |
|---|---|---|
| 2,138,751 | Vohrer | Nov. 29, 1938 |
| 2,461,613 | Quarles et al. | Feb. 15, 1949 |
| 2,824,780 | Satterthwaite | Feb. 25, 1958 |

FOREIGN PATENTS

| | | |
|---|---|---|
| 609,291 | Great Britain | Sept. 28, 1948 |